United States Patent Office 2,959,717
Patented Nov. 8, 1960

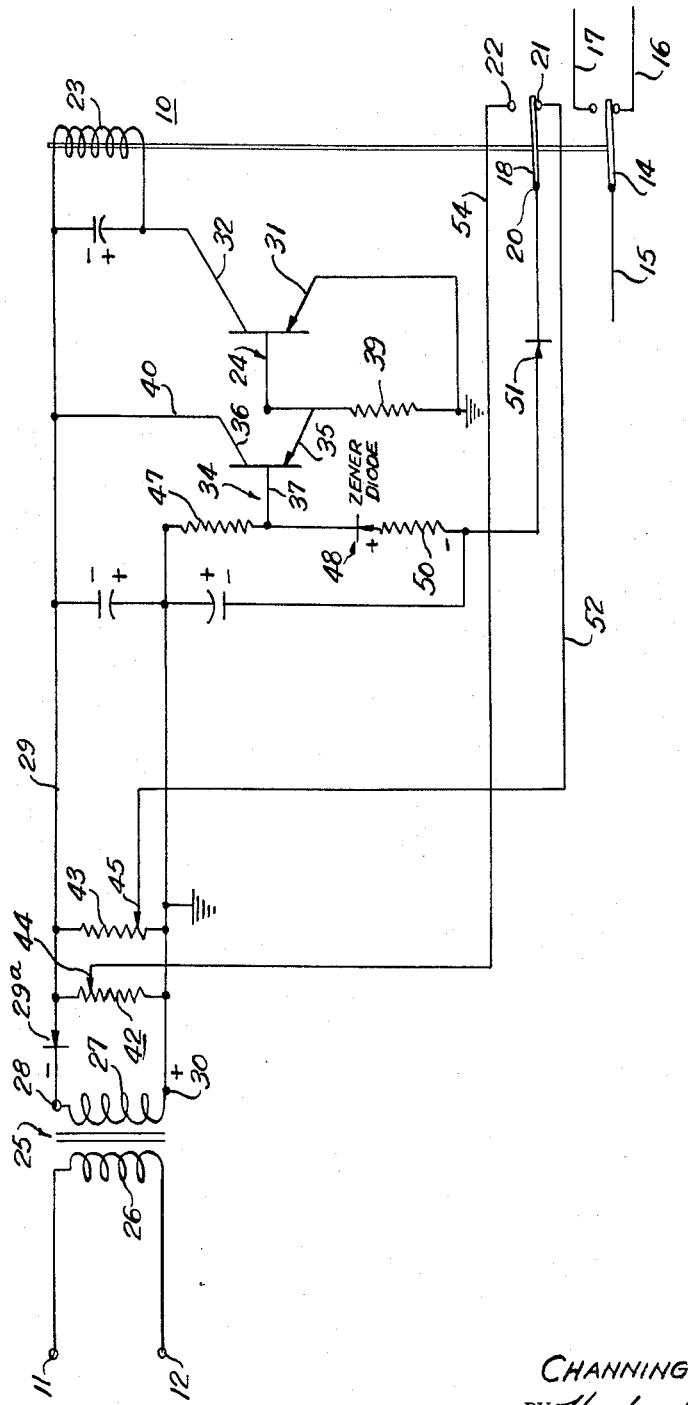

2,959,717

VOLTAGE RESPONSIVE RELAY

Channing C. Conger, Olmsted Falls, Ohio, assignor to The Controllix Corporation, Bedford, Ohio, a corporation of Ohio Filed Sept. 25, 1958, Ser. No. 763,374

9 Claims. (Cl. 317—148.5)

The present invention relates to voltage responsive relay circuits and, more particularly, to a circuit for picking up a relay when a voltage reaches a first selected magnitude and for dropping out the relay when the voltage drops to a preselected voltage below the first voltage.

The principal object of the present invention is to provide a new and improved, highly accurate, voltage responsive relay circuit having a relay to be picked up at one voltage and dropped out at a lower voltage in which the pickup voltage and the drop-out voltage and the difference therebetween may be readily adjusted.

Another object is to provide a highly accurate, relatively inexpensive, voltage responsive relay circuit for picking up a relay at one voltage and dropping it out at a lower voltage in which the difference between the pick-up and drop-out voltages may be very small and in which a relatively wide range of adjustment for the pickup and drop-out voltages is provided.

A further object is to provide a voltage responsive relay which embodies transistors, is highly acurate in its response, relatively inexpensive and simple to manufacture, and which has pickup and drop-out voltages adjustable over a relatively large range to adjust both the drop-out and pickup voltages and the difference therebetween.

The above objects and others are accomplished in the preferred embodiment of the present invention by providing a voltage dividing network which is connected across a voltage source; which network provides two output voltages that are individually adjustable portions of the voltage source; the output voltages control a switching transistor for controlling the energization of a relay and having an input circuit including a Zener diode which blocks the input current to the transistor when the voltage thereacross is below a predetermined magnitude; and the output voltages from the network are connected to the input circuit of the switching transistor through switching means operated so that when the relay is de-energized, one of the output voltages representing a portion of the voltage source is connected to the input circuit of the switching transistor and when energized, the other output voltage is applied to the input of the transistor.

The accompanying drawing forming a part of this specification shows the preferred form of the present invention and the sole figure thereof is a circuit diagram of the preferred embodiment.

In the preferred form of the invention, a relay 10 is to be picked up when the voltage across terminals 11, 12 reaches a predetermined magnitude and is to be dropped out when the voltage of the terminals 11, 12 falls to a predetermined magnitude below the pickup voltage. For example, the relay 10 may be picked up at 100 volts and dropped out at 90 volts. As shown in the drawing, the actuation of the relay 10 effects the operation of a switch bar 14 to connect a line 15 to either a line 16 or a line 17, depending upon whether the relay is energized or de-energized. When the relay 10 is de-energized, the line 15 is connected through the switch bar 14 to the line 16 and, when energized, is connected to the line 17. The operation of switch bar 14 may perform a control operation, such as cutting an impedance into and out of a circuit for controlling the voltage appearing across the terminals 11 and 12. The particular control operation performed by the actuation of the relay 10 does not form a part of the present invention and, therefore, is not shown or described in detail. In addition to the switch bar 14, the relay 10 includes a second switch bar 18 which connects a contact 20 with a contact 21 when the relay is de-energized and with the contact 22 when the relay is energized. The relay 10 is actuated by the energization of its relay coil 23 connected into the output circuit of a transistor 24.

In the illustrated embodiment, the power for the output circuit of the transistor 24 is obtained from the secondary of a transformer 25 having a primary coil 26 connected across the terminals 11, 12 and a secondary coil 27. One terminal 28 of the secondary coil 27 is connected to one side of the relay coil 23 by a connection 29, and the other terminal 30 of the secondary coil 27 is connected to an emitter electrode 31 of the transistor 24, the transistor 24 having a collector electrode 32 connected to the other side of the relay coil 23 so that the relay coil 23 is energized from the secondary coil 27 through the collector-emitter circuit of the transistor 24. The connection 29 includes a rectifier 29a which only permits current to flow from the terminal 30 of the secondary coil 27 to the terminal 28.

The output current in the collector-emitter circuit of the transistor 24 is controlled, in the illustrated embodiment, by the output current of a switching transistor 34 having an emitter electrode 35, a collector electrode 36 and a base electrode 37. The emitter electrode 35 of the switching transistor 34 is connected to the base electrode of the transistor 24 and to the terminal 30 of the secondary coil 27 through a resistor 39, the resistor 39 constituting an input resistor for the transistor 24. The collector 36 of the switching transistor 34 is connected to the terminal 28 of the secondary coil 27 by a connection 40 so that the collector-emitter output circuit of the transistor 34 is connected across the terminals 28, 30. It can be seen that the current flowing in the output circuit of the switching transistor 34 and through the resistor 39 biases the emitter of transistor 34 positively with respect to the base to cause output current to flow in the output circuit of the transistor 24. If there is no current through the resistor 39, the transistor 24 is shut off and no current flows through the transistor 24 or the relay coil 23.

According to the present invention, the input current to the transistor 24 is regulated so that when the voltage appearing at the terminals 11 and 12 is of a predetermined magnitude, input current will flow in the input circuit for the transistor 34 to cause the transistor 24 to conduct and energize the relay coil 23 and so that until the voltage reaches the predetermined magnitude, no input current flows in the input circuit of the transistor 34 and the relay 23 remains de-energized. After the relay 23 has been energized, the input circuit of the transistor 24 is so arranged that the input current will be maintained therein until the magnitude of the voltage at the terminals 11 and 12 falls to a predetermined voltage lower than the voltage at which the relay coil 23 was energized. When the voltage falls to this level, the input current to transistor 34 is blocked and the relay 23 de-energized. To this end, a voltage dividing resistor 42 and a voltage dividing resistor 43 are connected across the secondary coil 27. The voltage dividing resistors 42, 43 have slidable taps 44, 45, respectively, and constitute a voltage dividing network for selecting portions of the voltage appearing across the secondary coil 27, which portions are adjustable by moving the taps 44, 45. The taps may be adjusted individually or in unison with each other.

Until the voltage of the secondary reaches the magnitude at which the relay coil 23 is to be energized, the voltage appearing between the terminal 30 of the secondary coil 27 and the movable tap 45 of the voltage dividing resistor 43 is applied to the input circuit of the transistor 34. The input circuit for the transistor 34 includes a resistor 47 having one side connected to the positive end of the voltage dividing resistor 43 and the terminal 30 of the secondary coil 27 and the other side to the base electrode 37 of the transistor 34. The base electrode 37 is also connected to the contact 20 of the relay 10 through a Zener diode 48 and a resistor 50 connected in series, with the cathode of the Zener diode being connected directly to the base electrode 37, the anode of the diode to one side of the resistor 50, and the other side of the resistor 50 being connected to the contact 20 through a rectifier 51 poled to conduct current flowing from the base electrode 37. As long as the relay coil 23 is de-energized, the contact 20 of the relay 10 is connected by switch bar 18 to the contact 21 which is, in turn, connected to the movable tap 45 of the voltage dividing resistor 43 by a connection 52.

It will be appreciated that, as long as the voltage across the secondary coil 27 is below the breakdown voltage of the Zener diode 48, no input current flows in the input circuit for the transistor 34. However, when the voltage between the secondary coil terminal 30 and the movable tap 45 of the resistor 43 exceeds the breakdown voltage of the Zener diode 48, current will flow through the resistors 47, 50 from the secondary coil terminal 30. This current flow will, by reason of the voltage drop across the resistor 47, bias the base electrode 37 negatively with respect to the emitter of transistor 34 causing current to flow in the output circuit of the transistor 34. The input current upon the breakdown of the Zener diode is such that the current flowing in the output circuit of the transistor 34 provides an input current of sufficient magnitude for the transistor 24 to effect the energization of the relay coil 23.

When the relay coil 23 is energized to actuate the relay, the switch bar 18 of the relay is moved out of contact with the contact 21 and into contact with the contact 22. This disconnects the voltage dividing resistor 43 from the input circuit of the transistor 34 and connects the contact 20 to the movable tap 44 of the voltage dividing resistor 42 since the contact 22 is connected directly to the movable tap 44 by a connection 54. The voltage now applied to the input circuit of the transistor 34 is that portion of the voltage between the secondary terminal 30 and the movable tap 44 of the voltage dividing resistor 42. The voltage dividing resistor 42 is adjusted so that a larger portion of the voltage thereacross is applied to the input of the transistor 34 than was true of the resistor 42. This means that the Zener diode will be maintained conducting for lower voltage values occurring across the secondary coil 27, since a larger portion of that voltage is now applied to the input circuit of the transistor 34. The relay coil 23 will remain energized until the voltage across the Zener diode drops to a point where it ceases to conduct and again blocks the input current to the transistor 34 and effects a de-energization of relay coil 23 and a dropping out of relay 10. Consequently, the Zener diode will remain conducting until the voltage across terminals 11, 12 and consequently across the secondary coil 27, drops to a magnitude below that which caused the relay 23 to pick up. The drop-out voltage of the relay 23 may be adjusted by moving the adjustable tap 44 and may be adjusted so that it is extremely close to the pickup voltage.

It has been found that a relay constructed in accordance with the present invention is extremely accurate in response to the voltages to which it is adjusted and that a relatively wide range of adjustment may be obtained for both the pickup and drop-out voltages, as well as for the difference in the pickup and drop-out voltages.

It can now be seen that the foregoing objective and others can now be accomplished and that a new and an improved voltage responsive relay has been provided having a high accuracy in response to the voltages to which it is adjusted and which has a high range of adjustability.

While the present invention has been shown as embodying P–N–P transistors, it will be understood that the N–P–N transistors may be utilized and since transistor 24 is used for amplifying purposes, that other suitable amplification means may be utilized, if desired. Furthermore, the relay coil 23 could be connected directly into the output circuit of the switching transistor 34 if the output current of the transistor is sufficient to energize the relay coil 23.

Further modifications and constructions and arrangements will appear to those skilled in the art and it is hereby my intention to cover all such constructions, modifications and arrangements which fall within the ability of those skilled in the art and the scope and the spirit of the appended claims.

Having thus described my invention, I claim:

1. In a control system, a control relay to be actuated between open and closed positions in response to variation in the voltage of a voltage source and means for actuating said relay comprising a voltage dividing network connected across said source and providing first and second independently changeable voltage outputs which are preselected portions of the voltage appearing across said source, a transistor having an output circuit connected to control the energization of said relay, an input circuit for said transistor including a voltage breakdown device effective to block current flow in said input circuit until the voltage across said device reaches a predetermined magnitude, switching means for connecting one of said voltage outputs across said input circuit when said relay is de-energized and responsive to the energization of said relay to disconnect said one voltage output from said input circuit and connect the other voltage output across the input circuit of said transistor, the circuit parameters of said input circuit being such that the current flow therein upon the breakdown of said voltage device provides a current in the output circuit of said relay sufficient to effect actuation of said relay.

2. In a control system, the structure as defined in claim 1 wherein said voltage breakdown device is a Zener diode.

3. In a control system, the structure as defined in claim 1 wherein said switching means comprises contacts on said relay opened and closed by the actuation of the relay.

4. In a control system, the structure as defined in claim 1 wherein said switching means comprises contacts on said relay opened and closed by the actuation of the relay and said voltage breakdown device is a Zener diode.

5. In a control system, a control relay to be actuated between open and closed positions in response to variations in the voltage of a voltage source and means for actuating said relay comprising a voltage dividing network connected across said source and providing first and second outputs which are preselected portions of the voltage appearing across said source, a transistor having an output circuit connected to control the energization of said relay, an input circuit for said transistor including a voltage breakdown device effective to block current flow in said input circuit until the voltage across said device reaches a predetermined magnitude, switching means for connecting one of said voltage portions across said input circuit when said relay is de-energized and responsive to the energization of said relay to disconnect said one voltage portion and connect the other voltage portion across the input circuit of said transistor, the circuit parameters of said input circuit being such that the current flow therein upon the breakdown of said voltage device provides a current in the output circuit of said transistor sufficient to effect actuation of said relay, said voltage dividing network comprising a pair of voltage dividing resistors connected in parallel circuits across said voltage source, each of said resistors having a movable tap and said switching means being adapted to connect the voltage between the tap and one end of each of said resistors across the input circuit of said transistor.

6. In a control system, the structure as defined in claim 5 wherein said switching means comprises contacts on said relay opened and closed by the actuation of the relay.

7. In a control system, the structure as defined in claim 5 wherein said switching means comprises contacts on said relay opened and closed by the actuation of the relay and said voltage breakdown device is a Zener diode.

8. In a control system, a control relay to be actuated between energized and de-energized positions in response to variations in the voltage of a voltage source and means for actuating said relay comprising a voltage dividing network connected across said source and providing first and second independently changeable voltage outputs which are preselected portions of the voltage appearing across said source, voltage responsive control means having an output circuit connected to energize said relay and an input circuit controlling said output circuit and effective to cause said output circuit to energize said relay when a predetermined voltage is applied to said input circuit and to de-energize said relay when a voltage below the predetermined voltage is applied to said input circuit, and switching means connecting said network to said voltage responsive control means and connecting one of said voltage outputs to said input circuit when said relay is de-energized and responsive to the energization of said relay to disconnect said one voltage output from said input circuit and connect the other voltage output to the input circuit.

9. In a control system, the structure as defined in claim 8 wherein said voltage dividing network comprises first and second voltage dividing resistors connected in parallel circuits across said voltage source, each of said resistors having a movable tap and said switching means being adapted to connect the voltage at the tap of each of said resistors to said input circuit alternately.

References Cited in the file of this patent

UNITED STATES PATENTS

| | | |
|---|---|---|
| 2,769,131 | Immel | Oct. 30, 1956 |
| 2,771,570 | Flubacker | Nov. 20, 1956 |
| 2,774,015 | White | Dec. 11, 1956 |
| 2,816,262 | Elliott | Dec. 10, 1957 |
| 2,866,106 | Schuh | Dec. 23, 1958 |